United States Patent
Yamashita et al.

(10) Patent No.: US 12,186,712 B2
(45) Date of Patent: Jan. 7, 2025

(54) CARBON MEMBRANE FOR FLUID SEPARATION USE

(71) Applicant: TORAY INDUSTRIES, INC., Tokyo (JP)

(72) Inventors: Yuki Yamashita, Otsu (JP); Dai Kondo, Otsu (JP); Takaaki Mihara, Otsu (JP); Tomoyuki Horiguchi, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 669 days.

(21) Appl. No.: 17/419,830

(22) PCT Filed: Jan. 16, 2020

(86) PCT No.: PCT/JP2020/001199
§ 371 (c)(1),
(2) Date: Jun. 30, 2021

(87) PCT Pub. No.: WO2020/149352
PCT Pub. Date: Jul. 23, 2020

(65) Prior Publication Data
US 2022/0080365 A1    Mar. 17, 2022

(30) Foreign Application Priority Data

Jan. 18, 2019  (JP) ................ 2019-006739

(51) Int. Cl.
*B01D 71/02* (2006.01)
*B01D 53/22* (2006.01)
(Continued)

(52) U.S. Cl.
CPC ......... *B01D 71/021* (2013.01); *B01D 53/228* (2013.01); *B01D 67/0067* (2013.01);
(Continued)

(58) Field of Classification Search
CPC ...... B01D 71/02; B01D 69/105; B01D 53/22; B01D 67/00; B01D 69/10; B01D 69/12;
(Continued)

(56) References Cited

U.S. PATENT DOCUMENTS

| | | | |
|---|---|---|---|
| 2014/0199478 A1 | 7/2014 | Ichikawa et al. | |
| 2015/0147470 A1* | 5/2015 | Arrowood ............ | B01D 69/125 427/244 |

(Continued)

FOREIGN PATENT DOCUMENTS

| | | |
|---|---|---|
| JP | 5-220360 A | 8/1993 |
| JP | 2013-27823 A | 2/2013 |

(Continued)

OTHER PUBLICATIONS

Extended European Search Report for European Application No. 20741887.2, dated Jul. 1, 2022.
(Continued)

*Primary Examiner* — Walter D. Griffin
*Assistant Examiner* — Cameron J Allen
(74) *Attorney, Agent, or Firm* — Birch, Stewart, Kolasch & Birch, LLP (57) ABSTRACT

An object of the present invention is to suppress a defect in a carbon membrane for fluid separation use with a dense carbon layer formed on a porous carbon support. The present invention is a carbon membrane for fluid separation use, including a dense carbon layer formed on a porous carbon support, wherein X<Y when the ratio of the content of silicon atoms to the total content of carbon atoms and silicon atoms at the center position in the membrane thickness direction of the porous carbon support is X (atomic %), and the ratio of the content of silicon atoms to the total content of carbon atoms and silicon atoms at the position of 3 μm from the interface between the porous carbon support and (Continued)

the dense carbon layer to the porous carbon support side is Y (atomic %).

10 Claims, 3 Drawing Sheets

(51) Int. Cl.
    *B01D 67/00*     (2006.01)
    *B01D 69/08*     (2006.01)
    *B01D 69/10*     (2006.01)

(52) U.S. Cl.
    CPC .......... *B01D 69/087* (2013.01); *B01D 69/105* (2013.01); *B01D 69/108* (2022.08); *B01D 2256/245* (2013.01); *B01D 2257/504* (2013.01); *B01D 2323/12* (2013.01); *B01D 2325/023* (2013.01)

(58) Field of Classification Search
    CPC .......... B01D 71/56; B01D 61/02; D01D 5/06; D01D 5/24; D01D 6/18; D01D 6/54; D01D 9/22
    See application file for complete search history.

(56) References Cited

U.S. PATENT DOCUMENTS

2016/0367935 A1   12/2016   Ma et al.
2017/0216779 A1    8/2017   Takeuchi et al.

FOREIGN PATENT DOCUMENTS

| WO | WO 94/22561 A1 | 10/1994 |
| WO | WO 2013/042262 A1 | 3/2013 |
| WO | WO 2013/095775 A1 | 6/2013 |
| WO | WO 2016/013676 A1 | 1/2016 |
| WO | WO 2019/006438 A1 | 1/2019 |

OTHER PUBLICATIONS

International Search Report, issued in PCT/JP2020/001199, PCT/ISA/210, dated Mar. 24, 2020.
Written Opinion of the International Searching Authority, issued in PCT/JP2020/001199, PCT/ISA/237, dated Mar. 24, 2020.

* cited by examiner

Figure 5

CARBON MEMBRANE FOR FLUID SEPARATION USE

TECHNICAL FIELD

The present invention relates to a carbon membrane for fluid separation use.

BACKGROUND ART

The membrane separation method is used as a means for selectively separating and purifying a specific component from various mixed gases and mixed liquids. The membrane separation method is attracting attention because this method saves energy as compared with other fluid separation methods. For example, an organic polymer membrane such as a polyimide membrane and a cellulose acetate membrane; and an inorganic membrane such as a zeolite membrane, a silica membrane, or a carbon membrane have been proposed as a type of separation membrane.

Of these, the carbon membrane has a molecular sieving effect of separability depending on the molecular size of the separation target, and is excellent in heat resistance and durability. Therefore, various separation membranes having a separation layer composed of a dense carbon layer have been proposed. For example, proposed are: a porous ceramic composite hollow fiber membrane that is obtained by supporting a carbon thin film on the surface of a porous ceramic hollow fiber membrane (for example, refer to Patent Document 1); a hollow fiber carbon membrane comprising a first carbon membrane having a hollow fiber shape and a second carbon membrane provided on the outer surface of the first carbon membrane wherein the second carbon membrane includes a metal element and sulfur element (for example, refer to Patent Document 2); and a carbon membrane for fluid separation use that has a core layer having a co-continuous porous structure, and a skin layer formed around the core layer and having substantially no co-continuous porous structure (for example, refer to Patent Document 3).

PRIOR ART DOCUMENTS

Patent Documents

Patent Document 1: Japanese Patent Laid-open Publication No. 08-299769
Patent Document 2: Japanese Patent Laid-open Publication No. 2013-63415
Patent Document 3: International Publication No. 2016/13676

SUMMARY OF THE INVENTION

Problems to be Solved by the Invention

The carbon membrane can improve the separation performance and the permeation performance; however, in recent years, separation and purification at high pressure has been required. For example, in a natural gas refining plant, it is necessary to separate and remove carbon dioxide of impurity from methane gas of the main component, and the higher pressure difference between the upstream side and the downstream side of the separation membrane results in the higher permeation rate. Therefore, from the viewpoint of energy efficiency, separation and purification is required at a high gas pressure of several MPa or more. In addition, in the chemical industry, the membrane separation method has been used in the process of separating and purifying water of impurity from alcohol and acetic acid, and separation and purification at high pressure is required in order to improve the permeation flow rate of the target substance to be separated.

However, the separation membranes having a separation layer composed of a conventional carbon layer described in Patent Documents 1 to 3 are problematic in that defects such as pinhole and crack easily occur due to the factors including: the effect of stress by expansion or contraction in the production process and the separation and purification process; the defect derived from a hollow fiber membrane (core layer); and the defect by insufficient interfacial affinity between the hollow fiber membrane (core layer) and the separation membrane, and these defects occur more easily under a high pressure condition.

Particularly, a support composed of carbon easily expands and contracts in the production process as compared with a support composed of ceramics such as alumina, and this generates the stress to easily cause a defect in the support or the carbon membrane. In addition, the production process of the carbon support is problematic in that the supports are fused by contact with each other and then peeled to generate a defect, and this defect causes the defect of the carbon membrane.

When the defect generated in the separation membrane composed of the carbon layer is larger than the fluid molecule to be separated, the fluid to be separated leaks through the defect and therefore the defect is required to be suppressed.

Solutions to the Problems

The present invention for solving the above problem is a carbon membrane for fluid separation use, the membrane including a dense carbon layer formed on a porous carbon support, wherein X<Y when the ratio of the content of silicon atoms to the total content of carbon atoms and silicon atoms at the center position in the membrane thickness direction of the porous carbon support is X (atomic %), and the ratio of the content of silicon atoms to the total content of carbon atoms and silicon atoms at the position of 3 μm from the interface between the porous carbon support and the dense carbon layer to the porous carbon support side is Y (atomic %).

Effects of the Invention

The present invention can suppress a defect in a carbon membrane for fluid separation use with a dense carbon layer formed on a porous carbon support.

EMBODIMENTS OF THE INVENTION

Hereinafter, in the present description, "~" shall indicate a range including the numerical values at both ends thereof.

<Carbon Membrane for Fluid Separation Use>

Figure 1:
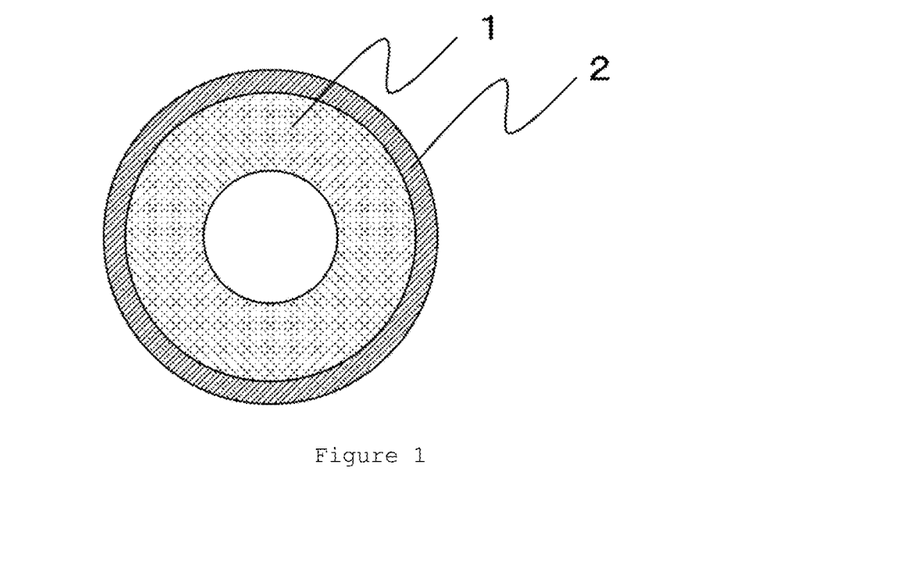
FIG. 1 shows an example of a schematic cross-sectional view of a carbon membrane for fluid separation use.

FIG. 1 shows an example of a schematic cross-sectional view of the carbon membrane for fluid separation use according to the present invention. The carbon membrane for fluid separation use according to the present invention has a structure with a dense carbon layer 2 formed on a porous carbon support 1. In FIG. 1, the carbon membrane for fluid separation use obtained by forming the dense carbon layer 2 on the porous carbon support 1 and the outer surface thereof has a hollow fiber shape, but the shape is not limited to this, and may have a solid fiber shape or may have a film shape.

[Porous Carbon Support]

A porous carbon support (hereinafter, the porous carbon support may be simply referred to as "support") is a base material for maintaining the shape of the dense carbon layer having a function as a separation membrane. The support is formed from a carbon material, and therefore has higher heat resistance and chemical resistance than the support of organic polymer. Herein, the carbon support refers to a support having a maximum ratio of carbon atoms to all contained atoms. Specifically, it means that the ratio of the content of carbon atoms to the total content of all atoms at the center position in the membrane thickness direction of the support is the maximum in the ratio of the content of each atom. The ratio of the content of carbon atoms to the total content of all atoms at the center position in the membrane thickness direction of the support is preferably 60 atomic % or more, and more preferably 65 atomic % or more, from the viewpoint of improving the heat resistance and chemical resistance of the fluid separation membrane. Whereas, the ratio of the carbon atom content is preferably 95 atomic % or less, and more preferably 85 atomic % or less, from the viewpoint of improving handleability by increasing flexibility.

The carbon atom content with respect to the total atom content at the center position in the membrane thickness direction of the support can be determined by using an energy dispersive X-ray spectroscopy (EDX) and then by performing elemental analysis under the condition of an acceleration voltage of 15 keV. The measurement is performed for random 10 pieces of data of the center position in the membrane thickness direction of the support, determined by the method described later, and using the obtained values calculates an average value of the ratio of the carbon atom content to the total atom content. This average value is regarded as the ratio of the content of carbon atoms to the total content of all atoms at the center position in the membrane thickness direction of the support. However, when the support is solid, the position of the center of gravity in the cross section of the support is measured as the center position in the membrane thickness direction of the support, and when no other point to be scanned can be obtained in one cross section, another cross section is prepared and the above operation is repeated, and the average value obtained from the measured values of 10 pieces of data is used to calculate the ratio of the carbon atom content.

Figure 3:
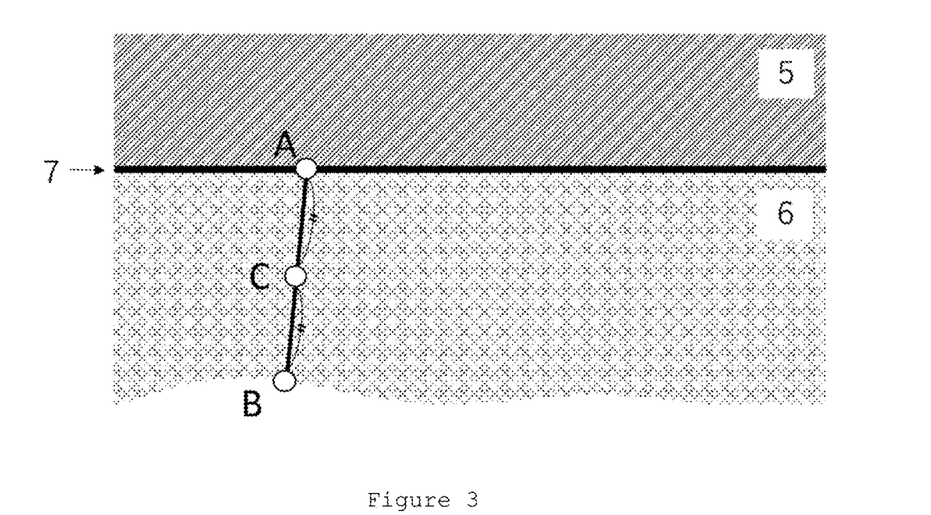
FIG. 3 shows a diagram of a method for determining a measurement location of X.

This will be described with reference to FIG. 3. The center position of the support in the membrane thickness direction refers to the midpoint (point C in FIG. 3) of the line segment connected by the two points: one point (point A in FIG. 3) randomly selected from an interface 7 between a dense carbon layer 5 and a support 6, determined by the method described later, after the cross section of the support is exposed by the cross-section polisher method (CP method); and the other point (point B in FIG. 3) having the shortest distance to the above point on the interface, of the points on the other support surface that is different from the support surface that is the interface with the dense carbon layer. However, when the support is solid, the position of the center of gravity in the cross section of the support is regarded as the center position of the membrane thickness.

The interface between the support and the dense carbon layer is the interface between the layer in which clear pores are observed and the layer in which no clear pores are observed. Specifically, the field of view in the cross section formed by the CP method is moved from the dense carbon layer to the support side at a magnification of 1±0.1 (nm/pixel) by using a scanning electron microscope (SEM), and the first observed edge of the pores on the dense carbon layer side is regarded as the interface between the dense carbon layer and the support.

In addition, the support has a porous structure, and therefore also has a role as a flow path for fluid such as gas or liquid. Examples of the porous structure include various porous structures such as a closed cell structure and a continuous porous structure. The closed cell structure improves the cross-sectional compressive strength. Whereas, a continuous porous structure is preferable because the pressure drop when the fluid permeates is small and the permeation rate of the fluid is improved.

Figure 2:
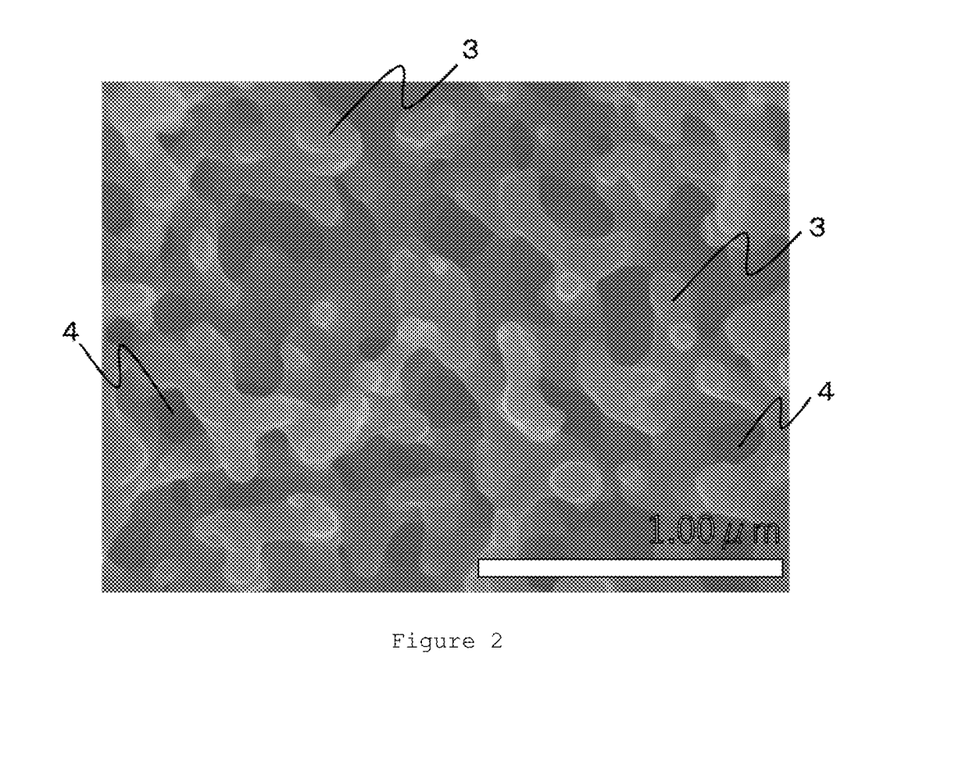
FIG. 2 shows an example of an enlarged photograph of a co-continuous porous structure.

The co-continuous porous structure, which is a form of the continuous porous structure, is preferable as the porous structure of the support. The co-continuous porous structure is a structure in which a branch portion (carbon portion) and a pore portion (void portion) are continuously entwined three-dimensionally and regularly. FIG. 2 shows an example of an enlarged photograph of the co-continuous porous structure. As shown in FIG. 2, a branch portion 3 and a void portion 4 each have a continuous structure in the depth direction. As a result of such a structure, the branch portions have the effect of supporting each other to distribute the stress over the entire support, and therefore the cross-sectional compressive strength is improved and the damage can be suppressed even at a high pressure of the fluid supplied.

The porous structure of the support can be observed by cutting the support sufficiently cooled in liquid nitrogen with, for example, tweezers to obtain a cross section and then by magnifying and observing with a scanning electron microscope. The co-continuous porous structure is distinguished from irregular structures such as a structure in which individual particles are aggregated and connected or a structure formed by voids created by removing aggregated-connected template particles and the surrounding skeleton.

The porous structure of the support is preferably a highly uniform structure having a periodic structure, and the structural period is preferably 0.002 µm or more and 10 µm or less. When the structural period is 0.002 µm or more, the pressure drop when the fluid passes through the void portion is reduced, and therefore the permeation rate of the fluid is improved. The structural period is more preferably 0.01 µm or more, and more preferably 0.05 µm or more. Whereas, when the structural period is 10 µm or less, the cross-sectional compressive strength is improved. The structural period is more preferably 8 µm or less.

The structural period of the porous structure is calculated by the following formula from the value of the scattering angle $2\theta$ at the position of the peak top of the scattering intensity obtained by incident X-rays on the carbon membrane for fluid separation use according to the present invention and scattering at a small angle.

$$P = \frac{\lambda}{2\sin\theta} \quad \text{[Formula 1]}$$

P: structural period (μm), λ: wavelength of incident X-rays (μm)

Herein, when the structural period of the support is large and scattering at a small angle cannot be observed, the structural period is obtained by X-ray computed tomography (X-ray CT). Specifically, after Fourier transforming a three-dimensional image taken by X-ray CT, the circular average of the two-dimensional spectrum is taken to obtain a one-dimensional spectrum. The characteristic wavelength corresponding to the position of the peak top in the one-dimensional spectrum is obtained, and the structural period of the porous carbon support is calculated from the reciprocal of the characteristic wavelength.

In the analysis of the above structural period, the structural period of the dense carbon layer is out of the above range, and therefore the analysis is not affected. Therefore, the structural period of the porous carbon support is the same as the value of the structural period calculated by measuring the entire carbon membrane for fluid separation use.

Furthermore, when the uniformity of the porous structure is high, the starting point of fracture of the carbon membrane for fluid separation use is hard to occur, and the effect of distributing the stress caused by, for example, compression over the entire carbon membrane is obtained to improve the cross-sectional compressive strength. In addition, the flexibility is improved, and therefore the bending radius can be reduced.

The uniformity of the porous structure can be evaluated by the half width of the peak of the scattering intensity when X-rays are incident on the carbon membrane for fluid separation use according to the present invention. Specifically, in a graph in which the horizontal axis is the scattering angle 2θ and the vertical axis is the scattering intensity, the half width of the peak of the scattering intensity is smaller, meaning that the uniformity is higher. The half width of the peak is preferably 5° or less, more preferably 1° or less, and still more preferably 0.1° or less.

The half width of the peak described above is the width of the peak at the midpoint (point C) of the line segment connecting the points A and B when the apex of the peak is point A, a straight line parallel to the vertical axis of the graph is drawn from point A, and the intersection of the straight line and the baseline of the spectrum is point B. The width of the peak herein is the width of the straight line that is parallel to the baseline and passes through point C.

The average porosity of the porous structure of the support is preferably 10% or more and 80% or less. To calculate the average porosity, the cross section of the support precisely formed from the embedded sample by the CP method is observed at a magnification of 1±0.1 (nm/pixel) at a resolution of 700000 pixels or more, and from the image, the area of interest required for calculation is set with 512 pixel square. Subsequently, the value of the average porosity is calculated by the following formula wherein the cross-sectional area is A and the total area of the pores is B, and is determined by the arithmetic mean value of randomly selected cross-sections at 20 locations. When the carbon membrane for fluid separation use is a hollow fiber, the hollow portion is not included in the average porosity.

Average porosity (%)=$B/A$×100

The average porosity is higher, reducing the pressure drop when the fluid flows and improving the fluid permeation rate. Therefore, the average porosity is more preferably 15% or more, and still more preferably 18% or more. Whereas, the average porosity is lower, improving the cross-sectional compressive strength, and thus the fluid can permeate under a high pressure condition. Therefore, the average porosity is more preferably 75% or less, and still more preferably 70% or less.

In addition, when the average pore diameter of the support is large, the pressure drop is reduced and the permeation rate of the fluid is improved. Therefore, the average pore diameter is preferably 30 nm or more, and more preferably 50 nm or more. Whereas, when the average pore diameter is small, the cross-sectional compressive strength is improved. Therefore, the average pore diameter is preferably 3000 nm or less, and more preferably 2500 nm or less.

For the average pore diameter of the support, the value obtained by analyzing the carbon membrane for fluid separation use by the mercury press-in method is used. In the mercury press-in method, the pore volume and specific surface area are first obtained from the pressure when mercury is penetrated into the pores by applying pressure and the amount of the pressed-in mercury. Subsequently, from the relationship between the pore volume and the specific surface area, the pore radius or diameter is calculated by assuming that the pore is a cylinder. In the mercury press-in method, a pore diameter distribution curve in the range of 5 nm or more and several 100 μm or less can be obtained, and the pore diameter at the peak top is used as the average pore diameter of the support. The dense carbon layer does not have pores of 5 nm or more, and therefore the average pore diameter of the carbon membrane for fluid separation use is substantially the same as the average diameter of the pores of the support. When the form of the support is a solid fiber, a porous structure is formed on the support.

In the present invention, the shape of the support is preferably a fiber shape or a film shape. The fiber shape means that the ratio of the fiber length L to the average diameter D of the fiber (aspect ratio L/D) is 100 or more, and examples thereof include a hollow fiber having a void portion (hollow portion) with substantially the same diameter formed continuously in the fiber axial direction (longitudinal direction) and a solid fiber having no hollow portion. In the case of the fiber shape, the membrane area per unit volume of the separation module can become larger than that of the film shape, and therefore the separation module becomes compact.

When the support has a fiber shape, the average diameter thereof can be set optionally. When the average diameter is large, pressure drop between the upstream side and the downstream side (permeation side) of the membrane is hard to occur, and the differential pressure required for fluid permeation is easy to maintain. Therefore, the average diameter is preferably 100 μm or more. Whereas, when the average diameter is small, the bending rigidity is improved and the membrane area per unit volume in the separation module is large. Therefore, the average diameter is preferably 500 μm or less. In addition, the cross-sectional shape of the fiber is optional, and examples thereof include a round cross section, a multi-leaf cross section such as a triangle, a flat cross section, and a hollow cross section. The round cross section is preferable because the cross-sectional compressive strength is high.

When the support has a hollow fiber shape, the area ratio of the cross-sectional area C of the hollow portion to the cross-sectional area A of the support (hollow area ratio: C/A) is preferably 0.001 or more and 0.7 or less. The hollow area ratio is larger, reducing the pressure drop and improving the fluid permeation rate. Therefore, the hollow area ratio is more preferably 0.01 or more, and still more preferably 0.05 or more. Whereas, the hollow area ratio is smaller, increasing the cross-sectional compression strength. Therefore, the hollow area ratio is more preferably 0.6 or less.

When the hollow area ratio is within the above range, the balance between the cross-sectional compression strength and the permeation rate of the fluid is excellent. The cross-sectional area A of the support includes the cross-sectional area C of the hollow portion. In addition, in order to achieve both the cross-sectional compressive strength and the fluid permeation rate, the support may have a plurality of hollow portions, and in that case, the total cross-sectional area of the hollow portions is defined as the cross-sectional area C of the hollow portion.

In addition, in the case of the hollow fiber shape, the stress generated by the carbonization shrinkage of the carbonizable resin is absorbed by the presence of the hollow portion at carbonization for forming the dense carbon layer, and therefore preferably defects such as cracks hardly occur.

When the membrane thickness of the hollow fiber-shaped support is thick, the cross-sectional compressive strength and handleability are improved. Therefore, the membrane thickness of the support is preferably 10 μm or more, and more preferably 30 μm or more. Whereas, the membrane thickness of the support is thinner, improving the permeability and flexibility, and therefore, the membrane thickness of the support is preferably 200 μm or less, and more preferably 100 μm or less.

Whereas, when the support has a film shape, the thickness of the support is not limited. When the thickness of the support is large, the handleability is improved. Therefore, the thickness is preferably 10 μm or more. In addition, when the thickness of the support is small, the bending rigidity is improved and breakage hardly occurs. Therefore, the thickness is preferably 5000 μm or less.

The membrane thickness of the support is the average of the values measured for 10 pieces of data randomly selected for the length of the line segment connecting the two points: one point randomly selected from the interface between the dense carbon layer and the support, determined by the method described above; and the other point having the shortest distance to the above point on the interface, of the points on the other support surface that is different from the support surface that is the interface with the dense carbon layer.

The investigation by the present inventors has found that in the carbon membrane for fluid separation use, containing silicon in the vicinity of the interface between the support and the dense carbon layer is hard to generate defects in the dense carbon layer. The reason is not clear; however, it is considered that containing silicon in the vicinity of the interface between the support and the dense carbon layer results in the following: the improved wettability of the support during formation of the dense carbon layer by improving the surface condition of the interface between the support and the dense carbon layer; suppression of coarse pore formation; suppression of shrinkage and expansion in the production step; and suppression of the support defects caused by fusion and peeling between the supports.

In the present invention, X<Y when the ratio of the content of silicon atoms to the total content of carbon atoms and silicon atoms at the center position in the membrane thickness direction of the porous carbon support is X (atomic %), and the ratio of the content of silicon atoms to the total content of carbon atoms and silicon atoms at the position of 3 μm from the interface between the porous carbon support and the dense carbon layer to the porous carbon support side is Y (atomic %). The present invention focuses, the content of silicon atoms at the position of 3 μm from the interface between the porous carbon support and the dense carbon layer to the porous carbon support side, as an index of the content of silicon atoms unevenly distributed in the vicinity of the interface between the porous carbon support and the dense carbon layer, and identifies the relationship with the content of silicon atoms at the center position in the membrane thickness direction, which is an index of the content of silicon atoms of the porous carbon support other than the interface with the dense carbon layer. The above relationship between X and Y satisfies X<Y, meaning that the ratio of the content of silicon atoms in the vicinity of the interface with the dense carbon layer is higher than that at the center portion of the porous carbon support, that is, silicon atoms are unevenly distributed in the vicinity of the interface with the dense carbon layer. From the viewpoint of further suppressing defects, the difference between the Y and the X (Y−X) is preferably 0.01 or more, more preferably 0.10 or more, and still more preferably 1 or more. Whereas, from the viewpoint of suppressing peeling of the support and the dense carbon layer and further suppressing defects, Y−X is preferably 15 or less, more preferably 10 or less, and still more preferably 8 or less.

X is preferably 10 or less, and more preferably 5 or less, from the viewpoint of improving chemical resistance, compression resistance, and permeability. In addition, Y is preferably 0.01 or more, and more preferably 1 or more, and still more preferably 5 or more from the viewpoint of further suppressing defects. Whereas, from the viewpoint of increasing the adhesion between the support and the dense carbon layer, suppressing the peeling of the support and the dense carbon layer, and further suppressing defects, Y is preferably 40 or less, more preferably 20 or less, and still more preferably 10 or less.

Examples of the means for setting X<Y, that is, unevenly distributing silicon in the vicinity of the interface include a method of adding a silicon-containing component by a preferable method described later in the production method of the present invention described later.

Metal atoms are preferably contained together with silicon atoms in the vicinity of the interface between the support and the dense carbon layer, and defects can be further suppressed. An alkali metal and an alkaline earth metal are preferable as the metal atom. Two or more of these may be contained. Of these, sodium and calcium are more preferable.

The ratio Z (atomic %) of the content of metal atoms to the total content of carbon atoms and metal atoms at the position of 3 μm from the interface between the porous carbon support and the dense carbon layer to the porous carbon support side is regarded as an index of the content of metal atoms in the vicinity of the interface, and Z is preferably more than 0, and more preferably 0.0010 or more.

Examples of the method for setting Z in the above range include a method of adding a metal-containing component by a preferable method described later in the production method of the present invention described later.

Each of the contents of carbon atoms and silicon atoms at the center position in the membrane thickness direction of the porous carbon support can be determined by using an energy dispersive X-ray spectroscopy (EDX) and then by performing elemental analysis under the condition of an acceleration voltage of 15 keV. The content of carbon atoms and silicon atoms at the center position in the membrane thickness direction of the support can be obtained by the method described above as the method for measuring the ratio of the content of carbon atoms to the total content of all atoms at the center position in the membrane thickness direction of the support. Ten pieces of data are randomly selected from the center positions of the support in the membrane thickness direction, determined by the above method, and elemental analysis is performed to calculate the ratio of the content of silicon atoms to the total content of carbon atoms and silicon atoms at each location, and the average value for 10 pieces of data is regarded as the ratio X (atomic %) of the content of silicon atoms to the total content of carbon atoms and silicon atoms at the center position in the membrane thickness direction of the porous carbon support.

In addition, each of the contents of carbon atoms, silicon atoms, and metal atoms at the position of 3 μm from the interface between the porous carbon support and the dense carbon layer to the porous carbon support side can be determined by using an energy dispersive X-ray spectroscopy (EDX) and then by performing elemental analysis under the condition of an acceleration voltage of 15 keV. Ten pieces of data are randomly selected from the positions of 3 μm from the interface between the support and the dense carbon layer, determined by the method described later to perform elemental analysis, and at each location, the ratio of the content of silicon atoms to the total content of carbon atoms and silicon atoms and the ratio of the content of metal atoms to the total content of carbon atoms and metal atoms are calculated. Each of the average values for 10 pieces of data is regarded as the ratio Y (atomic %) of the content of silicon atoms to the total content of carbon atoms and silicon atoms at the position of 3 μm from the interface between the porous carbon support and the dense carbon layer to the porous carbon support side, and the ratio Z (atomic %) of the content of metal atoms to the total content of carbon atoms and metal atoms at the position of 3 μm from the interface between the porous carbon support and the dense carbon layer to the porous carbon support side.

Figure 4:
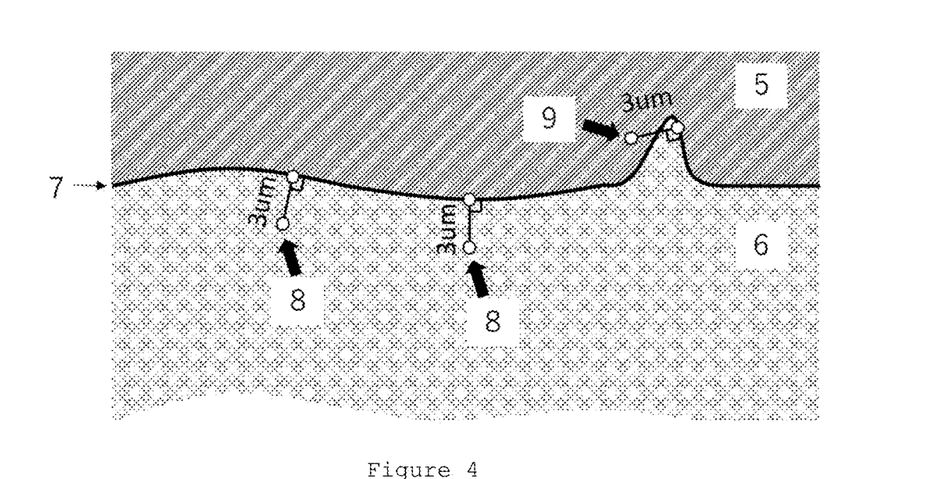
FIG. 4 is a diagram of a method for determining measurement locations of Y and Z.

The position of 3 μm from the interface between the porous carbon support and the dense carbon layer to the porous carbon support side refers to the position at which the field of view is moved by 3 μm from the interface between the support and the dense carbon layer, determined by the above method, to the support side in the direction going straight with the interface with the dense carbon layer. This will be described with reference to FIG. 4. It is measurable 8 when the location resulted from the movement of the field of view by 3 μm is inside the support, such as a point on the dense carbon layer. It is not-measurable 9 when the location resulted from the movement of the field of view by 3 μm is a point other than the support, such as a point on the dense carbon layer, and a different point is selected.

[Dense Carbon Layer]

A dense carbon layer is formed on the support and functions as a fluid separation layer. The dense carbon layer is a layer composed of carbon and in which no pores are observed on the surface or cross section with a scanning electron microscope. No pores are observed with a scanning electron microscope, meaning that no clear pores are observed when the cross section formed by the CP method is observed at a magnification of 1±0.1 (nm/pixel). Therefore, only pores below the resolution are also included. Herein, the dense carbon layer is composed of carbon, meaning that the ratio of carbon atoms to the total number of all atoms contained in the dense carbon layer is the maximum.

The dense carbon layer is typically formed on the outer surface side of the support; however, in the case of the carbon membrane for fluid separation use with a hollow fiber shape, the dense carbon layer may be formed on the inner surface side, that is, the surface side in contact with the hollow portion, or may be formed on both sides of the outer surface side and the inner surface side. In addition, in the case of the carbon membrane for fluid separation use with a film shape, the dense carbon layer may be on both sides of the film or only on one side. When the dense carbon layers are on both sides, the fluid can be separated by the dense carbon layers on both sides by supplying the fluid from the cross section of the film to the support.

The thickness of the dense carbon layer, that is, the membrane thickness is not particularly limited, and can be appropriately set according to the application for example. Generally, the membrane thickness is smaller, improving the permeation rate of the fluid, and therefore 10 μm or less is preferable, 5 μm or less is more preferable, and 1 μm or less is more preferable. Whereas, a larger membrane thickness suppresses fluid leakage and improves the separation function, and therefore 1 nm or more is preferable, and 10 nm or more is more preferable. Herein, the membrane thickness of the dense carbon layer is the average of the values measured at 10 pieces of data randomly selected for the length of the line segment connected by two points: one point on the interface between the support and the dense carbon layer, determined by the method described above; and the other point having the shortest distance the other point having the shortest distance to the above point on the interface, of the points on the other dense-carbon-layer surface different from the dense-carbon-layer surface that is the interface with the support, when observing the cross section of the carbon membrane for fluid separation use (cross section perpendicular to the fiber axis in the case of a fiber shape, cross section in the thickness direction in the case of a film shape) by using a scanning electron microscope.

The ratio of the content of silicon atoms to the total content of carbon atoms and silicon atoms at the center position in the membrane thickness direction of the dense carbon layer is preferably 10 atomic % or less, more preferably 3 atomic % or less, and still more preferably 0.5 atomic % or less, from the viewpoint of improving the separation coefficient.

The contents of carbon atoms and silicon atoms at the center position in the membrane direction of the dense carbon layer can be measured by using an energy dispersive X-ray spectroscopy (EDX) and then by performing elemental analysis under the condition of an acceleration voltage of 5 keV. Ten pieces of data are randomly selected from the center positions in the membrane thickness of the dense carbon layer, determined as described later, and elemental analysis is performed to calculate the ratio of the content of silicon atoms to the total content of carbon atoms and silicon atoms at each data. The average value for 10 pieces of data is regarded as the ratio of the content of silicon atoms to the total content of carbon atoms and silicon atoms at the center position in the membrane thickness direction of the dense carbon layer.

Figure 5:
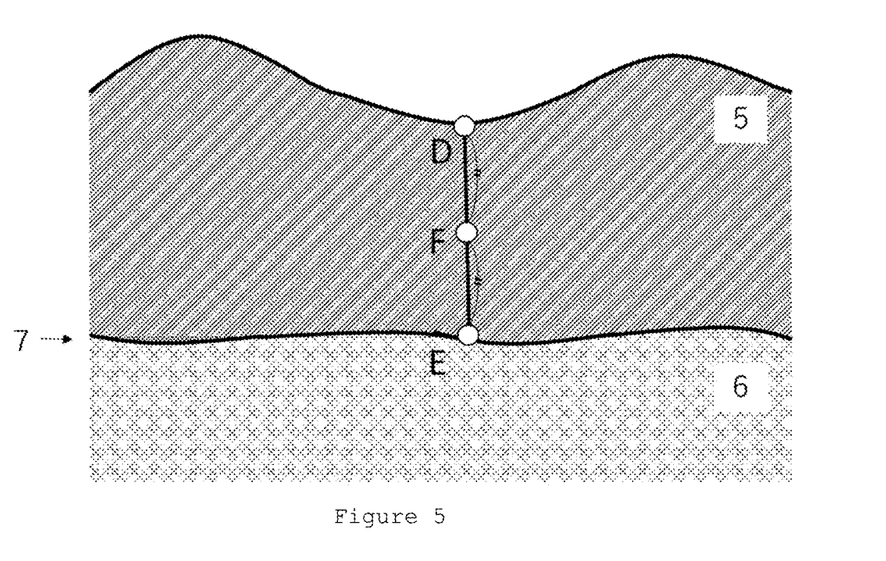
FIG. 5 shows a diagram of a method for determining the center position of a dense carbon layer in the membrane thickness direction.

This will be described with reference to FIG. 5. The center position of the dense carbon layer in the membrane thickness direction is the midpoint (point F in FIG. 5) of the line segment connected by two points: one point (point D in FIG. 5) on the interface 7 between support 5 and dense carbon layer 6, determined by the above method; and the other point (point E in FIG. 5) having the shortest distance to the above point on the interface, of the points on the other dense-carbon-layer surface different from the dense-carbon-layer surface that is the interface with the support.

<Method for Producing Carbon Membrane for Fluid Separation Use>

Examples of the method for producing a carbon membrane for fluid separation use according to the present invention include the method having: a step of carbonizing a molded product including a resin that is a precursor of a support to provide the support (step 1); a step of forming a carbonizable resin layer as a precursor of a dense carbon layer on the support (step 2); and a step of carbonizing the carbonizable resin layer to form the dense carbon layer (step 3).

[Step 1]

Step 1 is a step of providing a support by carbonizing a molded product including a resin to be a precursor of the support (hereinafter, sometimes referred to as "support precursor resin").

Examples of the support precursor resin include a thermoplastic resin and a thermosetting resin. Examples of the thermoplastic resin include polyphenylene ether, polyvinyl alcohol, polyacrylonitrile, phenol resin, aromatic polyester, polyamic acid, aromatic polyimide, aromatic polyamide, polyvinylidene fluoride, cellulose acetate, polyetherimide, and the copolymers thereof. Examples of the thermosetting resin include unsaturated polyester resin, alkyd resin, melamine resin, urea resin, polyimide resin, diallyl phthalate resin, lignin resin, urethane resin, phenol resin, polyfurfuryl alcohol resin, and the copolymers thereof. Two or more of these may be used. Of these, a thermoplastic resin capable of solution spinning is preferable, and polyacrylonitrile and aromatic polyimide are particularly preferable.

The weight average molecular weight (MW) of the support precursor resin is preferably 10000 or more from the viewpoint of suppressing thread breakage in the spinning step and film breakage in the membrane forming step. Whereas, the weight average molecular weight (MW) of the support precursor resin is preferably 1,000,000 or less from the viewpoint of improving moldability.

In addition to the support precursor resin, it is preferable to add a disappearing component that can be eliminated after molding to the molded product including the support precursor resin. For example, preparing a resin mixture with a resin that disappears due to subsequent heating such as carbonization or dispersing particles that disappear due to subsequent heating such as carbonization can not only form a porous structure but also easily adjust the average diameter of the pores forming the pore structure of the porous structure to a desired range.

As an example of means for obtaining a molded product including a support precursor resin, an example of adding a resin (disappearing resin) that disappears after carbonization will be described. The support precursor resin and the disappearing resin are mixed to provide a resin mixture. The mixing ratio is preferably 10 to 90% by mass of the disappearing resin with respect to 10 to 90% by mass of the support precursor resin.

Herein, it is preferable to select a resin that is compatible with the carbonizable resin as the disappearing resin. For the compatibility method, only the resins may be mixed or a solvent may be added. The combination of such a carbonizable resin and a disappearing resin is not limited, and examples thereof include polyacrylonitrile/polyvinyl alcohol, polyacrylonitrile/polyvinylphenol, polyacrylonitrile/polyvinylpyrrolidone, and polyacrylonitrile/polylactic acid.

The obtained resin mixture is preferably phase-separated during the molding. The method for phase separation is not limited, and examples thereof include a heat-induced phase separation method and a non-solvent-induced phase separation method.

When the support has a fiber shape, the precursor of the support can be formed by solution spinning. Solution spinning is a method of dissolving a resin in various solvents to prepare a spinning stock solution, passing through a bath composed of a solvent to be a poor solvent for the resin, and solidifying the resin to provide a fiber. Examples of the solution spinning include dry spinning, dry wet spinning, and wet spinning.

For example, the resin mixture prepared as described above is extruded from the outer tube of the hollow spinning spout having a double tube structure, and at the same time, gas such as air and nitrogen, the same solvent as the spinning stock solution, and the solution dissolving a disappearing resin are discharged from the inner tube of the spinning spout. Such a method can provide a molded product having a hollow fiber shape.

In addition, appropriately controlling the spinning conditions can suppress the formation of a dense layer on the outer periphery of the fiber and open the surface of the porous carbon support. Examples of spinning using the non-solvent-induced phase separation method include the method of appropriately controlling the composition and temperature of the spinning stock solution and the coagulation bath, or discharging the spinning solution from the inner tube and simultaneously discharging the same solvent as the spinning solution or the solution dissolving a disappearing resin from the outer tube.

The fiber spun by the method described above is coagulated in a coagulation bath, followed by washing with water and drying to provide a precursor of the support. Herein, examples of the coagulating liquid include water, ethanol, saline solution, and the mixed solvent of these and the solvent used in step 1. It is also possible to elute the solvent and the disappearing resin by immersing the fiber in a coagulation bath or a water bath before the drying step.

Whereas, when the support has a film shape, a molded product including the support precursor resin can be produced by a known casting method or spin coating method.

When the support has a fiber shape, a silicon-containing component is preferably added after washing with water. When the support has a film shape, the silicon-containing component is preferably added, for example, after removing the solvent component. Examples of the silicon-containing component include silicone oil, silicone resin powder, and silica particles. The powder or particles may be surface-treated to enhance dispersibility. In addition, an emulsifier may be added together with the silicon-containing component. From the viewpoint of uniformly imparting the silicon-containing component, the silicon-containing component is preferably used in the form of an emulsion, a slurry, or a solution. The solvent for dissolving or dispersing the silicon-containing component is preferably a poor solvent for the support precursor resin, and preferably water, ethanol, and acetone, for example.

When spinning by the so-called multifilament method in which two or more of fiber-shaped support precursors are treated at the same time in contact with each other, a silicon-containing component is preferably added before drying from the viewpoint of preventing fusion of the fibers during heating. Adding the silicon-containing component before drying can further suppress the occurrence of defects on the fiber surface, that is, the surface of the support when the fused surfaces of the fibers are peeled off.

Examples of the method for adding the silicon-containing component include: a dip method in which a support precursor is immersed in a silicon-containing liquid; a nozzle coating method or a spray coating method in which a silicon-containing liquid is applied or sprayed onto the support precursor; and a cast method. From the viewpoint of ease of the production method, when the support precursor has a film shape, the dip method and the cast method are preferable, and when the support precursor has a fiber shape, the dip method and the nozzle coating method are preferable.

Examples of the silicon-containing liquid include a slurry in which silica particles are dispersed and an emulsion in which silicone oil is dispersed. The degree of uneven distribution can be adjusted depending on the concentration of silicon atoms in the liquid.

When the silicon-containing component is added by the dip method, the dip time is preferably 1 second or more, more preferably 5 seconds or more, and still more preferably 10 seconds or more, from the viewpoint of easily adjusting the value of Y to the above preferable range. Whereas, the dip time is preferably 2 minutes or less, more preferably 1 minute or less, and still more preferably 30 seconds or less, from the viewpoint of easily adjusting the value of Y to the above preferable range.

Regarding the content of the silicon-containing component in the support precursor before infusibilization, containing is preferable from the viewpoint of preventing fusion, and the content is more preferably 0.1% or more, and still more preferably 0.5% or more. In addition, from the viewpoint of efficiently performing the infusibilization treatment and improving the permeability of the support, the content is preferably 50% or less, more preferably 30% or less, and still more preferably 15% or less.

Regarding the amount of the silicon-containing component adhered, about 3 g of the support precursor is collected, the precursor weight $W_1$ after drying at 80° C. for 24 hours is weighed, and the weighed support precursor is immersed in hexane for 6 hours to extract the silicon-containing component. Thereafter, the support precursor is taken out from hexane, washed with pure, dried at 80° C. for 24 hours, the weight $W_2$ of the support precursor is measured, and calculation is performed by the following formula.

(Amount of silicon-containing component adhered)= $(W_1-W_2)/W_2 \times 100 [\%]$.

When the support contains a metal atom, the metal-containing component may be added to the support precursor resin solution, or the metal-containing component is added by a dip method or a nozzle coating method using the metal-containing component. The metal-containing component may be mixed with the silicon-containing component, and the metal and silicon may be added simultaneously.

Examples of the metal-containing component include sodium chloride, calcium chloride, and magnesium chloride. The amount of the metal atom to be added can be adjusted by, for example, the concentration of the metal atom in the metal-containing component or the contact time between the metal-containing component and the support precursor.

The precursor of the support produced by the above method can be infusibilized before being carbonized. Examples of the infusibilization treatment include a method of heating the precursor in the presence of oxygen to cause oxidative cross-linking, a method of irradiating the precursor with high-energy rays such as electron beams and gamma rays to form a cross-linked structure, and a method of impregnating and mixing a substance having a reactive group in the precursor to form a crosslinked structure. Two or more of these may be combined. Of these, the method of heating the precursor in the presence of oxygen to cause oxidative cross-linking is preferable because the process is simple and the production cost is low.

The precursor of the support, which has been infusibilized as necessary, is finally carbonized to become the support. Carbonization is preferably performed by heating in an inert gas atmosphere. Examples of the inert gas include helium, nitrogen, and argon. The flow rate of the inert gas may be an amount that can sufficiently reduce the oxygen concentration in the heating device, and it is preferable to appropriately select an optimum value according to the size of the heating device, the supply amount of the raw material, and the carbonization temperature. The disappearing resin may be removed by thermal decomposition due to heat during carbonization.

When the carbonization treatment is continuously performed, in order to increase the productivity, preferable is a method of taking out the support while continuously supplying the support into the heating device maintained at a constant temperature by using, for example, a roller or a conveyor.

When carbonization is performed by batch processing, the temperature-rising rate and the temperature-falling rate can be set arbitrarily. From the viewpoint of productivity, the temperature-rising rate and the temperature-falling rate are preferably both 1° C./min or more. Whereas, the upper limits of the temperature-rising rate and the temperature-falling rate are not limited, and can be arbitrarily set as long as defects such as cracks do not occur.

In addition, the holding time of the carbonization temperature can be arbitrarily set. Regarding the holding time, the holding time can be set within a range in which the support does not shrink in the second carbonization treatment (step 3) for forming the dense carbon layer, as described later, and is preferably 1 minute or more and 3 hours or less.

The carbonization temperature is preferably 500° C. or more and 2400° C. or less. Herein, the carbonization temperature is the maximum temperature during the carbonization treatment. From the viewpoint of improving the function as a support, the carbonization temperature is more preferably 900° C. or more. Whereas, from the viewpoint of reducing brittleness and improving handleability, the carbonization temperature is more preferably 1500° C. or less.

[Step 2]

Step 2 is a step of forming a carbonizable resin layer as a precursor of the dense carbon layer on the support prepared in step 1. Producing the support and the dense carbon layer in separate steps can arbitrarily set the thickness of the dense carbon layer. Therefore, for example, the permeation rate of the fluid can be improved by reducing the thickness of the dense carbon layer, and thus the design of the separation membrane structure becomes easy.

Various resins showing fluid separability after carbonization can be adopted as the carbonizable resin. Examples of the carbonizable resin include polyacrylonitrile, aromatic polyimide, polybenzoxazole, aromatic polyamide, polyphenylene ether, phenol resin, cellulose acetate, polyflufuryl alcohol, polyvinylidene fluoride, lignin, wood tar, and intrinsic porous polymer (PIM). Two or more of these may be used. Of these, preferable are polyacrylonitrile, aromatic polyimide, polybenzoxazole, aromatic polyamide, polyphenylene ether, and intrinsic porous polymer (PIM) because of excellent permeation rate and separability of the fluid, and polyacrylonitrile and aromatic polyimide are more preferable. The carbonizable resin may be the same as or different from the support precursor resin described above.

The method for forming the carbonizable resin layer is not limited, and a known method can be adopted. A general forming method is a method of coating the support with the carbonizable resin itself; however, examples of the forming method include a method of coating a support with a precursor of the resin and then reacting the precursor to form a carbonizable resin layer, or a counter diffusion method with the reaction of a reactive gas or solution flowed from the outside and inside of the support. Examples of the reaction include the reactions of polymerization, cyclization, and cross-linking by heating or a catalyst.

Examples of the method for coating the carbonizable resin layer include a dip coating method, a nozzle coating method, a spray method, a vapor deposition method, and a cast coating method. From the viewpoint of ease of production, the dip coating method or the nozzle coating method is preferable when the support has a fiber shape, and the dip coating method or the cast coating method is preferable when the support has a film shape.

The dip coating method is a method of pulling a support that has been immersed in a coating stock solution including a solution of a carbonizable resin or a precursor thereof.

The viscosity of the coating stock solution in the dip coating method can be arbitrarily set depending on the condition such as the surface roughness of the support, the pulling speed, and the desired membrane thickness. When the viscosity of the coating stock solution is high, a uniform resin layer can be formed. Therefore, the shear viscosity at a shear rate of $0.1\ s^{-1}$ is preferably 10 mPa·s or more, and more preferably 50 mPa·s or more. Whereas, the viscosity of the coating stock solution is lower, decreasing the membrane thickness and improving the permeation rate of the fluid. Therefore, the shear viscosity at a shear rate of $0.1\ s^{-1}$ is preferably 1,000 mPa·s or less, and more preferably 800 mPa·s or less.

The pulling speed of the support in the dip coating method can also be arbitrarily set depending on the coating condition. When the pulling speed is high, the thickness of the carbonizable resin layer becomes thick, and thus defects for the carbon membrane can be suppressed. Therefore, the pulling speed is preferably 1 mm/min or more, and more preferably 10 mm/min or more. Whereas, when the pulling speed is low, the membrane thickness uniformity of the carbonizable resin layer is improved, and the permeation rate of the fluid is improved. Therefore, the pulling speed is preferably 1,000 mm/min or less, and more preferably 800 mm/min or less. The temperature of the coating stock solution is preferably 20° C. or more and 80° C. or less. When the temperature of the coating stock solution is high, the surface tension is lowered, the wettability to the support is improved, and the thickness of the carbonizable resin layer becomes uniform.

The nozzle coating method is a method of laminating a resin or a resin precursor on a porous carbon support by passing the porous carbon support through a nozzle that has been filled with a coating stock solution, which is a solution of a carbonizable resin or the precursor thereof. The viscosity and temperature of the coating stock solution, the nozzle diameter, and the passing speed through the porous carbon support can be set arbitrarily.

In the subsequent infusibilization treatment step or carbonization step (step 3) with a multifilament treatment, an oil agent is preferably added in order to suppress defect formation during fusion and fiber separation. Examples of the oil agent include silicone-based oil agents and non-silicone-based oil agents. Examples of the silicone-based oil agent include amino-modified silicone and epoxy-modified silicone. Two or more of these may be used.

[Infusibilization Treatment]

The support produced in step 2 on which the carbonizable resin layer is formed (hereinafter referred to as "support/carbonizable resin layer composite") may be subjected to infusibilization treatment before the carbonization treatment (step 3). The method of infusibilization treatment is not limited, and is accordance with the above infusibilization treatment of the precursor of the porous carbon support.

[Step 3]

Step 3 is a step of heating the support/carbonizable resin layer composite that has been produced in step 2 and further subjected to infusibilization treatment as necessary to carbonize the carbonizable resin layer and forming a dense carbon layer.

In this step, the support/carbonizable resin layer composite is preferably heated in an inert gas atmosphere. The flow rate of the inert gas may be an amount that can sufficiently reduce the oxygen concentration in the heating device, and it is preferable to appropriately select an optimum value according to the size of the heating device, the supply amount of the raw material, and the carbonization temperature. The upper limit of the flow rate of the inert gas is not limited, but it is preferable to appropriately set the flow rate according to the temperature distribution and the design of the heating device, from the viewpoint of economy and reducing the temperature change in the heating device.

In addition, heating in a mixed gas atmosphere of the above inert gas and active gas can chemically etch the surface of the porous carbon support to adjust the pore diameter on the surface of the support to a desired range. Examples of the active gas include oxygen, carbon dioxide, water vapor, air, and combustion gas. The concentration of the active gas in the inert gas is preferably 0.1 ppm or more and 100 ppm or less.

The carbonization temperature in this step can be arbitrarily set as long as the permeation rate and separation coefficient of the carbon membrane for fluid separation use are improved; however, this temperature is preferably lower than the carbonization temperature when the precursor of the support in step 1 is carbonized. As a result, the rates of dimension change by moisture absorption for the support and the carbon membrane for fluid separation use can be reduced to suppress breakage of the carbon membrane for fluid separation use in the separation module and to improve the permeation rate and separation performance of the fluid. The carbonization temperature in this step is preferably 500° C. or more, and more preferably 550° C. or more. In addition, this temperature is preferably 850° C. or less, and more preferably 800° C. or less.

Other preferable aspects of carbonization are in accordance with carbonization of the precursor of the above support.

[Post-Treatment Step]

The carbon membrane for fluid separation use produced in steps 1 to 3 can be subjected to various known post-treatments in order to provide a desired permeation rate and separation coefficient. Examples of the post-treatment include heat treatment and pore control by chemical vapor deposition (CVD).

EXAMPLE

Examples of preferable embodiments of the present invention are described below; however, the present invention is not limited to these descriptions. The evaluation method in each example will be described.

(Measurement of Content of Silicon Atom, Carbon Atom, and Metal Atom)

Regarding the carbon membrane for fluid separation use obtained in each example and comparative example, the surface formed by the CP method was observed by moving the field of view at a magnification of 1±0.1 (nm/pixel) from the dense carbon layer to the porous carbon support side, and the edge of the pores observed for the first time on the dense carbon layer side was regarded as the interface between the dense carbon layer and the porous carbon support.

At the midpoint of the line segment connecting the point on the interface between the dense carbon layer and the support and the point on the surface of the other support where the length of the line segment connecting with the point on the interface is minimized, that is, random 10 pieces of data selected for central positions of the support in the membrane thickness direction, elemental analysis was performed under the condition of an acceleration voltage of 15 keV by using an energy dispersive X-ray spectroscopy (S-5500 manufactured by Hitachi High-Tech Corporation); the content of each element of carbon atoms, silicon atoms, and metal atoms was measured; and from the average value for 10 pieces of data, the ratio X of the content of silicon atoms to the total content of carbon atoms and silicon atoms at the center position in the membrane thickness direction of the porous carbon support was calculated.

The field of view was moved by 3 μm from the determined interface toward the porous carbon layer side in the direction going straight with the surface of the dense carbon layer; at random 10 pieces of data selected at locations from a distance of 3 μm from the interface, elemental analysis was performed under the condition of an acceleration voltage of 15 keV by using an energy dispersive X-ray spectroscopy (S-5500 manufactured by Hitachi High-Tech Corporation); the content of each element of carbon atoms, silicon atoms, and metal atoms was measured; and from the average value of 10 pieces of data, the ratio Y of the content of silicon atoms to the total content of carbon atoms and silicon atoms at the position of 3 μm from the interface between the porous carbon support and the dense carbon layer to the porous carbon support side, and the ratio Z of the content of metal atoms to the total content of carbon atoms and metal atoms at the position of 3 μm from the interface between the porous carbon support and the dense carbon layer to the porous carbon support side were calculated.

(Measurement of the Number of Defects)

Prepared were three samples obtained by cutting the carbon membrane for fluid separation use obtained in each example and comparative example to a length of 20 cm; one end of each membrane was sealed; and while compressed air was supplied at 0.2 MPaG from the other ends of all of three samples to the hollow part, the samples were allowed to stand in the air for 10 seconds. Then, the samples were immersed in water under pressure and allowed to stand for 5 seconds. The number of bubbles adhering to the surface of each carbon membrane after 5 seconds was visually counted, and the total number of bubbles was regarded as the number of defects.

(Measurement of Separation Coefficient)

Regarding the carbon membrane for fluid separation use obtained in each example and comparative example, a module was prepared by using the carbon membrane for fluid separation use with the defects repaired after measuring the number of defects, and the gas permeation rate was measured. Carbon dioxide and methane were used as the measurement gases, and in accordance with the pressure sensor method of JIS K7126-1 (2006), the pressure changes per unit time on the permeation side for carbon dioxide and methane were measured by an external pressure method under the condition of a measurement temperature of 25° C. Herein, the pressure difference between the supply side and the permeation side was set to 0.11 MPa.

Subsequently, the gas permeation rate Q was calculated by the following formula. In addition, the ratio of the gas permeation rate of each component was defined as the separation coefficient α. Herein, the membrane area was calculated from the outer diameter and length in the region contributing to gas permeation. The part with the defect repaired was not included in the membrane area because of not contributing to permeation.

Permeation rate $Q$=[permeation gas amount (mol)]/[membrane area (m$^2$)×time (s)×pressure difference (Pa)]

The permeation rates Q of carbon dioxide and methane were measured, and (permeation rate of carbon dioxide)/(permeation rate of methane) was calculated as the separation coefficient.

Example 1

10 parts by mass of polyacrylonitrile (PAN) (MW 150000) manufactured by Polysciences Inc., 10 parts by mass of polyvinylpyrrolidone (PVP) (MW 40000) manufactured by Sigma Aldrich Co. LLC, and 80 parts by mass of dimethyl sulfoxide (DMSO) manufactured by Fujifilm Wako Pure Chemical Corporation were mixed and stirred at 100° C. to prepare a spinning stock solution.

After cooling the obtained spinning stock solution to 25° C., using a cap having concentric triple spouts, 80% by mass of an aqueous solution of DMSO was simultaneously discharged from the inner tube, the spinning stock solution from the middle tube, and 90% by mass of an aqueous solution of DMSO from the outer tube, and these were led to a coagulation bath composed of pure water at 25° C. and wound on a roller to obtain a raw fiber. Subsequently, both ends of the raw fiber were sealed; epoxy-modified silicone oil manufactured by Shin-Etsu Chemical Co., Ltd. was dipped for 20 seconds in an emulsion that had been dispersed in water by using an emulsifier containing sodium and thereby silicon was added; and drying at 80° C. for 1 hour with a circulating hot air dryer was performed to prepare a porous carbon support precursor having a hollow shape.

Subsequently, the porous carbon support precursor was passed through an electric furnace at 260° C. and heated in an air atmosphere for 1 hour to perform infusibilization treatment. Subsequently, the infusible fiber was carbonized at a carbonization temperature of 650° C. to prepare a porous carbon support having a hollow shape. Both the outer surface and the inner surface (surface of a hollow portion) of the produced porous carbon support were perforated, and when the cross section of the hollow fiber was observed, a co-continuous porous structure was observed.

Subsequently, the spinning stock solution was applied as a coating solution onto the surface of the support by the nozzle coating method to form a coating of a dense carbon layer precursor and to provide a precursor of a carbon membrane for fluid separation use. The obtained carbon membrane precursor was passed through an electric furnace at 260° C. and heated in an air atmosphere for 1 hour to perform infusibilization treatment. Subsequently, the precursor of the infusibilized carbon membrane was carbonized at a carbonization temperature of 650° C. to produce a carbon membrane for fluid separation use having a hollow shape.

When X and Y were measured for the produced carbon membrane for fluid separation use by the above method, X was 3.1 atomic % and Y was 8.9 atomic %. Sodium was detected as a metal atom from the support side, and Z was 0.023 atomic %. No defects were found, the permeation rate Q of carbon dioxide was $0.23 \times 10^{-9}$ mol/(m$^2 \cdot$Pa$\cdot$s), and the separation coefficient was 42.1.

Example 2

A carbon membrane for fluid separation use was produced in the same manner as in Example 1 except that the immersion time in the emulsion was 10 seconds. The produced carbon membrane for fluid separation use was evaluated in the same manner as in Example 1.

Example 3

A carbon membrane for fluid separation use was produced in the same manner as in Example 1 except that the immersion time in the emulsion was 5 seconds. The produced carbon membrane for fluid separation use was evaluated in the same manner as in Example 1.

Example 4

A carbon membrane for fluid separation use was produced in the same method as in Example 1 except that the method of adding silicon was nozzle coating. The produced carbon membrane for fluid separation use was evaluated in the same manner as in Example 1.

Example 5

A carbon membrane for fluid separation use was produced in the same manner as in Example 1 except that dipping was performed for 5 seconds in an epoxy-modified silicone oil manufactured by Shin-Etsu Chemical Co., Ltd. instead of the emulsion with the epoxy-modified silicone oil dispersed. The produced carbon membrane for fluid separation use was evaluated in the same manner as in Example 1.

Example 6

A carbon membrane for fluid separation use was produced in the same manner as in Example 1 except that dipping was performed for 20 seconds in a slurry in which nanosilica particles "SNOWTEX" (registered trademark) ZL manufactured by Nissan Chemical Corporation were dispersed in water at a concentration of 5% by mass instead of the emulsion with the epoxy-modified silicone oil dispersed. The produced carbon membrane for fluid separation use was evaluated in the same manner as in Example 1.

Example 7

A carbon membrane for fluid separation use was produced in the same manner as in Example 6 except that dipping was performed for 20 seconds in a slurry in which 4.7% by mass of the nanosilica particles and 0.3% by mass of magnesium chloride hexahydrate manufactured by Wako Pure Chemical Industries, Ltd. were dispersed in water instead of the slurry in which nanosilica particles "SNOWTEX" ZL manufactured by Nissan Chemical Corporation were dispersed in water at a concentration of 5% by mass. The produced carbon membrane for fluid separation use was evaluated in the same manner as in Example 1.

Example 8

A carbon membrane for fluid separation use was produced in the same manner as in Example 1 except that nanosilica particles "SNOWTEX" ZL manufactured by Nissan Chemical Corporation were added to the coating stock solution so as to have a concentration of 1% by mass. The produced carbon membrane for fluid separation use was evaluated in the same manner as in Example 1.

Comparative Example 1

A carbon membrane for fluid separation use was produced in the same manner as in Example 1 except that no silicon was added. The produced carbon membrane for fluid separation use was evaluated in the same manner as in Example 1.

Comparative Example 2

A carbon membrane for fluid separation use was produced in the same manner as in Example 1 except that a coating stock solution was prepared by mixing 24 parts by mass of polyether sulfone powder, grade 5200P, manufactured by Sumitomo Chemical Co., Ltd., 1 part by mass of magnesium chloride hexahydrate manufactured by Wako Pure Chemical Industries, Ltd., and 75% by mass of dimethylformamide manufactured by Wako Pure Chemical Industries, Ltd. and no silicon was further added to the support precursor. The produced carbon membrane for fluid separation use was evaluated in the same manner as in Example 1.

Comparative Example 3

Using a double tube cap, a spinning stock solution was simultaneously discharged from the outer tube and 80% by mass of an aqueous solution of DMSO from the inner tube, and then these were immediately led to a coagulation bath composed of pure water at 25° C. and wound on a roller to provide a raw fiber having an asymmetrical hollow shape. The obtained fiber was washed with water at 25° C. for 5 minutes and dried at 80° C. for 1 hour by using a circulating hot air dryer to provide a carbon membrane for fluid separation use having a hollow shape. Subsequently, the precursor of the carbon membrane for fluid separation use was passed through an electric furnace at 260° C. and heated in an air atmosphere for 1 hour to perform infusibilization treatment. Subsequently, the infusible fiber was carbonized at a carbonization temperature of 650° C. to produce a carbon membrane for fluid separation use having a hollow shape. The produced carbon membrane for fluid separation use had an asymmetric hollow shape, and a dense carbon layer was formed on the surface of the support layer composed of porous carbon. The porous portion had a co-continuous structure. The obtained carbon membrane for fluid separation use was evaluated in the same manner as in Example 1.

Table 1 shows the evaluation results of each example and comparative example.

TABLE 1

| | X [atomic %] | Y [atomic %] | Z [atomic %] | Detected metal atom | In the dense carbon layer of silicon content Ratio [atomic %] | Y-X | Defect number [pieces] | Carbon dioxide Permeation rate [×10$^{-9}$mol/ (m$^2$ · Pa · s)] | Separation coefficient |
|---|---|---|---|---|---|---|---|---|---|
| Example 1 | 3.1 | 8.9 | 0.023 | Sodium | 0 | 5.8 | 0 | 0.23 | 42.1 |
| Example 2 | 1.0 | 3.3 | 0.0081 | Sodium | 0 | 2.3 | 1 | 0.25 | 41.9 |
| Example 3 | 0.53 | 1.3 | 0.0036 | Sodium | 0 | 0.77 | 2 | 0.26 | 44.1 |
| Example 4 | 0.10 | 0.19 | 0.00055 | Sodium | 0 | 0.09 | 5 | 0.30 | 45.8 |
| Example 5 | 0.51 | 18.3 | 0 | — | 0 | 17.79 | 8 | 0.27 | 46 |
| Example 6 | 0.14 | 5.2 | 0 | — | 0 | 5.06 | 5 | 0.29 | 43.7 |
| Example 7 | 0.14 | 5.2 | 0.10 | Magnesium | 0 | 5.06 | 3 | 0.29 | 45.5 |
| Example 8 | 3.1 | 8.9 | 0.20 | Sodium | 5.1 | 5.8 | 0 | 2.0 | 11.7 |
| Comparative Example 1 | 0 | 0 | 0 | — | 0 | 0 | 17 | 0.33 | 43.2 |
| Comparative Example 2 | 0 | 0 | 0 | — | 0 | 0 | 14 | 0.76 | 31.5 |
| Comparative Example 3 | 0 | 0 | 0 | — | 0 | 0 | 12 | 0.11 | 41 |

DESCRIPTION OF REFERENCE SIGNS

1: Porous carbon support
2: Dense carbon layer
3: Branch portion
4: Void portion
5: Dense carbon layer
6: Support
7: Interface
8: Measurable
9: Not-measurable

The invention claimed is:

1. A carbon membrane for fluid separation use, the membrane including a dense carbon layer formed on a porous carbon support,
wherein the porous carbon support has a membrane thickness of 10 μm or more, and
wherein X<Y when a ratio of a content of silicon atoms to a total content of carbon atoms and silicon atoms at a center position of the porous carbon support in a membrane thickness direction of the porous carbon support is X (atomic %), and a ratio of a content of silicon atoms to a total content of carbon atoms and silicon atoms at a position of 3 μm from an interface between the porous carbon support and the dense carbon layer to a porous carbon support side is Y (atomic %).

2. The carbon membrane for fluid separation use according to claim 1, wherein a difference (Y-X) between the Y and the X values is 0.01 or more and 15 or less.

3. The carbon membrane for fluid separation use according to claim 1, wherein a difference (Y-X) between the Y and the X values is 0.10 or more and 10 or less.

4. The carbon membrane for fluid separation use according to claim 1, wherein a ratio of a content of silicon atoms to a total content of carbon atoms and silicon atoms at a center position of the dense carbon layer in a membrane thickness direction of the dense carbon layer is 3 atomic % or less.

5. The carbon membrane for fluid separation use according to claim 1, wherein Z is more than 0 when a ratio of a content of metal atoms to a total content of carbon atoms and metal atoms at a position of 3 μm from an interface between the porous carbon support and the dense carbon layer to a porous carbon support side is Z (atomic %).

6. The carbon membrane for fluid separation use according to claim 5, wherein Z is 0.0010 or more.

7. The carbon membrane for fluid separation use according to claim 5, wherein the metal atoms are sodium and/or calcium.

8. The carbon membrane for fluid separation use according to claim 5, wherein the metal atoms are an alkali metal and/or an alkaline earth metal.

9. The carbon membrane for fluid separation use according to claim 1, wherein the porous carbon support has a structural period of 0.002 μm or more and 10 μm or less.

10. The carbon membrane for fluid separation use according to claim 1, wherein the porous carbon support has a membrane thickness of 10 μm to 200 μm.

* * * * *